INVENTOR.
DONALD E. STOLLE

July 21, 1970 D. E. STOLLE 3,521,059
APPARATUS FOR RADIOGRAPHING PIPES HAVING A FILM
MARKER MEANS ASSOCIATED THEREWITH
Filed March 15, 1967 2 Sheets-Sheet 2
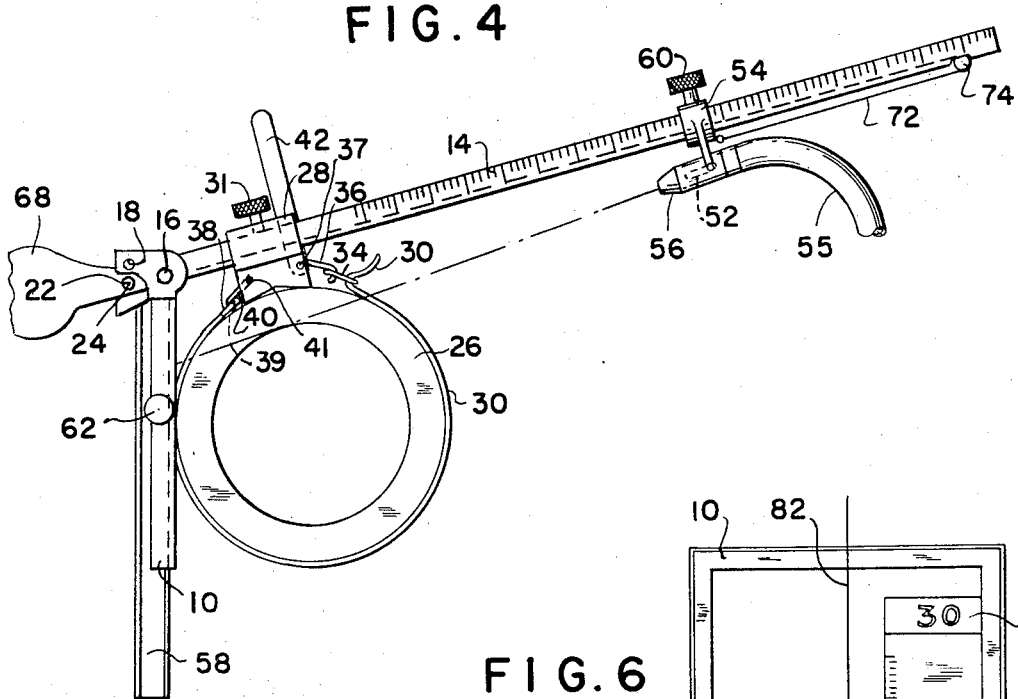
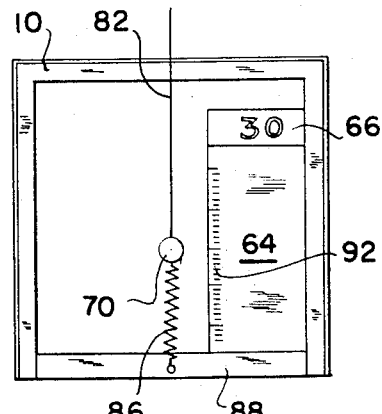
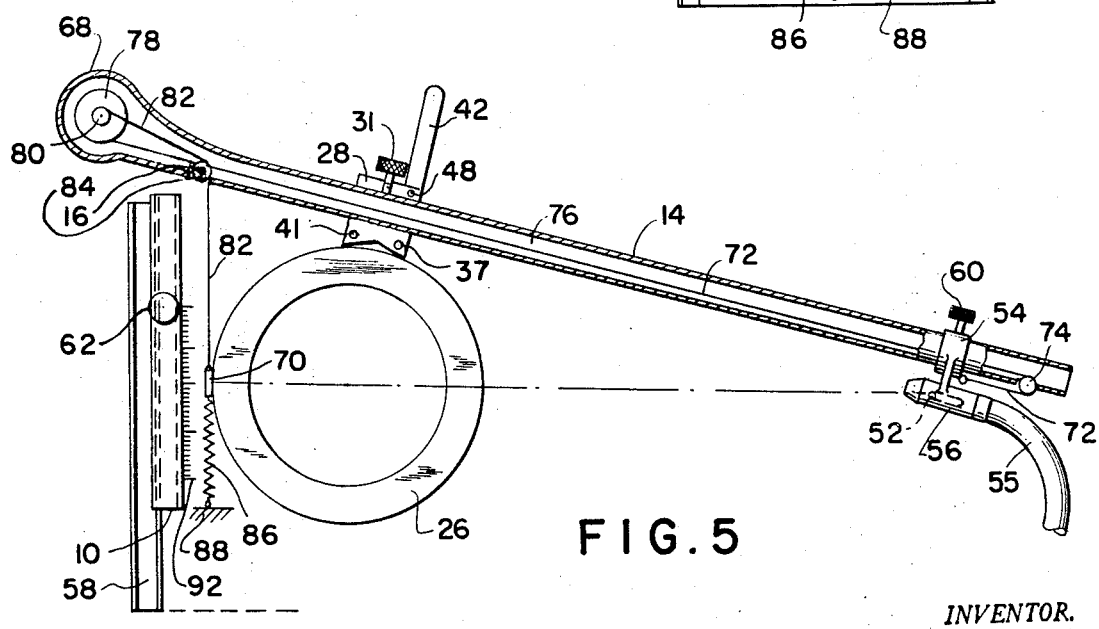
INVENTOR.
DONALD E. STOLLE
BY McLean, Morton and Boustead
ATTORNEYS United States Patent Office 3,521,059
Patented July 21, 1970

3,521,059
APPARATUS FOR RADIOGRAPHING PIPES HAVING A FILM MARKER MEANS ASSOCIATED THEREWITH
Donald E. Stolle, Aramco, Ras Tanura, Saudi Arabia (% Arabian American Oil Co., 505 Park Ave., New York, N.Y. 10022)
Filed Mar. 15, 1967, Ser. No. 623,281
Int. Cl. G03b 41/16
U.S. Cl. 250—65                                    11 Claims

ABSTRACT OF THE DISCLOSURE

A portable and accurate radiographic instrument, for radiographing pipes, is described, wherein the radiation source is adjustable to a predetermined geometric relationship to the film which is tangential to the pipe. A radiation impenetrable marker is interconnected with the radiation source and is projected on the film alongside a pipe circumference scale so that the operator can tell if a proper center-line examination of the pipe has been made. Various other data are also recorded on the film.

BACKGROUND OF THE INVENTION

Field of the invention

My invention relates to a radiographic method and apparatus for examining the physical characteristics of pipe walls and, in particular, to a radiographic flaw detection instrument of comparatively little weight wherein the radiation emission source and radiation sensitive film surface are mounted together in a manner to permit them to be affixed as a combined unit to the pipe to be radiographed and wherein their positioning relative to each other is calibrated to obtain optimum results for diversely dimensioned pipes.

Description of the prior art

In recent years radiographic flaw detection instruments have received considerable utilization both in quality control during the fabrication of fluid flow pipes, such as piping systems for chemical plants and petroleum plants, and in the maintenance of pipeline systems after construction to detect deterioration produced by the operating conditions of the systems. Such instruments generally include the positioning of a radiation sensitive film on one side of the pipe to be examined with a radiation emission being located on the opposite side of the pipe to transmit radiation through the pipe to produce a latent image of the pipe, pipe wall and any defects therein upon the radiation sensitive surface of the film. Upon development of the film, the quality of the pipe structure, including the interior of the pipe, can be determined by a careful interpretation of the image to resolve true pipe wall thickness, true pipe diameter and depth and extent of any defects.

Prior instruments used to inspect the quality of pipe systems generally have been extremely weighty and cumbersome thereby greatly enhancing the difficulty in transporting the instrument to pipelines located in remote and generally inaccessible areas. Frequently, pipe systems are so complex and inaccessible as to require expensive scaffolding to enable the operator to position the instrument. Furthermore, the weight of the prior instruments is so great that, in operation, the heavy protective lead shield employed to collimate and direct the radiation through the pipe wall is often removed by workers in the field, thereby, creating a hazardous health condition to personnel in the area. Because of the difficulties in utilizing such instruments, the economic advantage achieved by radiographic testing often is so small that other methods of examining pipeline walls, e.g., ultrasonic resistivity testing, are utilized in its place.

Prior instruments are generally characterized by separate positioning of the radiation emission source and radiation sensitive film often resulting in the angle and location of the radiation from the radiation source relative to the film being other than perpendicular at the geometric center of the sheet. A misalignment of this nature produces an image of the pipe wall which is not in a correct proportion or geometric position to be accurately interpreted unless the incidental angle by which the emitted radiation strikes the radiation sensitive film is known. Furthermore, the radiation source often is not easily adjustable for diversely dimensioned pipelines to guarantee the proper optimum proportion, e.g., the distance from the radiation source to the film, the distance from the radiation source to the pipe center, or the distance from the pipe center to the film, cannot be obtained precisely, thereby, resulting in an image upon the film which is greatly distorted and cannot be accurately interpreted. Distorted and blurred results also can be produced by a shifting in the positioning of the radiation source relative to the sensitive film, source to pipe or pipe to film.

Other variables, for example, the exposure time of the film to the radiation, the density of radiation generated by the source and the degree of pre-exposure oraging of the film, present obstacles, if not accurately known, which even the most experienced interpreter finds difficult or impossible to resolve. Still another problem encountered with radiography resides in the fact that an accurate record of the outside diameter of the pipe is not permanently maintained upon the film and if records are such that the diameter is not known, the film cannot be accurately interpreted.

SUMMARY OF THE INVENTION

An object of my invention is to provide a simple, lightweight, portable, self-supporting radiographic instrument which can be easily affixed to a pipe under examination without the necessity of extraneous supporting devices.

A further object of my invention is to provide a radiographic instrument wherein the radiographic source and the radiation sensitive film are integrally connected as a combined unit to prevent any slippage therebetween.

A further object of my invention is to provide a calibrated instrument wherein a proper minimum proportion can easily be obtained and the angle and positioning of the radiation source in relation to the film can be maintained at an optimum location.

It is still a further object of my invention to provide an instrument wherein an accurate permanent record of the pipe diameter and other variables is made on the film for subsequent accurate interpretation.

These and other objects of my invention are accomplished by producing a radiographic instrument including a film support frame pivotally joined to a bar extending angularly from the frame and carrying a positionable source of radiation emission. A flexible strap or belt extends from the extension bar and encompasses the outer circumference of the pipe for mounting and positioning the frame and bar on the pipe. By means of the strap, the pipe is held firmly against the extension bar and tangentially against the film support frame. Markings are provided which are responsive to the outer circumference of the pipe and are pre-calibrated to indicate the outer circumference of the pipe, to indicate the desired position of the radiation emission source on the extension bar, and to indicate the incidental point by which emitted radiation strikes the radiation sensitive film.

In a preferred embodiment, the strap is calibrated to indicate the precalculated distance the radiation emission source should be placed relative to the film according to pipe circumference. A marker or indicator on the slack buckle detects the length of flexible strap encompassing the pipe and indicates the corresponding calibration on the strap. The extension bar is calibrated in correlation with the strap calibrations. The radiation emission source is then locked in fixed position at the indicated optimum precalibrated position along the extension bar, and radiation sensitive film means are fixedly engaged to the support plate on the side of the pipe opposite the radiation emission source to obtain a film impression of the characteristics of the pipe thereon. To obtain a proper center-line shot through the pipe, the radiation emission source is positioned so that the emitted radiation passes through the center-line of the pipe and perpendicularly strikes the radiation sensitive film.

Radiation impenetrable indicia are positioned intermediate the source of radiation and the film within the path of radiation to provide a permanent record of data of variables on the film needed for subsequent accurate interpretation of the shot.

The instrument insures that for any size pipe the radiation emission source is located in such a geometric position that a line drawn from the source through the pipe center-line is perpendicular to the film, thus providing an image of correct proportion or geometric position for accurate interpretation.

The instrument, however, can be used if desired to make a non-center line examination, in which the radiation only passes angularly through the upper side wall of the pipe, by repositioning the angle of the extension bar. Thus, large diameter piping having relatively thick side walls can be inspected in a minimum time without supplementing the length of the extension bar with elongated extension pieces as would be required for precisley positioning the radiation source to obtain a proper minimum proportion for a center-line examination.

DESCRIPTION OF THE DRAWINGS

A more complete understanding of the basic principles of my invention will be obtained from the accompanying drawings in which:

FIG. 4 is a side elevation view of the radiographic instrument of FIG. 1 mounted upon a pipe for a non-center-line examination of the pipe wall;

FIG. 5 is a side elevation view, partially exploded, of the radiographic instrument of FIG. 1 whereby a center-line examination of the pipe wall is achieved; and FIG. 6 is a fragmentary back elevation view of the marking means of the radiographic instrument of FIG. 5.

As shown in FIGS. 1 and 2, the radiographic instrument of my invention includes a positioned, generally rectangularly-shaped cassette frame 10 having a support plate 12 secured centrally upon its topmost surface and an elongated extension bar 14 pivotally mounted about pin 16 within support plate 12 to permit angular displacement of the extension bar relative to cassette frame 10. Dual vertically displaced apertures 18 and 20 are provided, in the rearmost portion of support plate 12 remote from pin 16, to receive locking pin 22 when in alignment with aperture 24 (shown in FIG. 4) in the end portion of extension bar 14 adjacent support plate 12, thereby locking the extension bar in one of two angular attitudes relative to cassette frame 10 depending upon the diameter of the pipe. Thus when a center-line shot is desired, as shown in FIG. 1, locking pin 22 will extend through upper aperture 18 in support plate 12 and aperture 24 (shown in FIG. 4) in extension bar 14 to position the extension bar at an acute angle relative cassette frame 10 with lower aperture 20 in support plate 12 being surplusage.

In FIG. 1 the acute disposition of cassette frame 10 and extension bar 14 permits seating of the radiographic instrument against pipe 26, which is under examination, with the sidewall of pipe 26 tangentially abutting frame 10. A ski support fixture 28 (also termed positioning bar 28) slidably engaged along the length of extension bar 14 vertically displaces the extension bar from tangential engagement with the uppermost pipe wall and provides an arched guideway for the passage of adjustable strap or belt 30 therethrough. Ski support fixture 28 can be locked in a fixed position by means of thumb screw 31. Strap 30, fabricated from steel or some other durable fabric, is terminated at its extremity away from frame 10 by adjustable cinch fixture 34 which contains eye 32. End hook 36 that is pivotally mounted by means of bar 37 to the underportion of ski support fixture 28, engages eye 32. Strap 30 is terminated at its other extremity by non-adjustable end fixture 38 which contains eye 39. End hook 40, that is pivotally mounted by means of bar 41 to the underportion of ski support fixture 28, engages eye 39. Lever 42 is fixedly secured to one end of bar 37 which is pivotally mounted within ski support fixture 28. Upon partial rotation of lever 42 about its pivot point by a force applied to the end of lever 42, pipe 26 is drawn into solid contact with ski support fixture 28 whereupon all the component parts are secured in position by locking pin 48 which is inserted through aligned apertures in ski support fixture 28 and lever 42. Both extension bar 14 and strap 30 are provided with calibrated markings spaced along their exterior surfaces.

Figure 1:
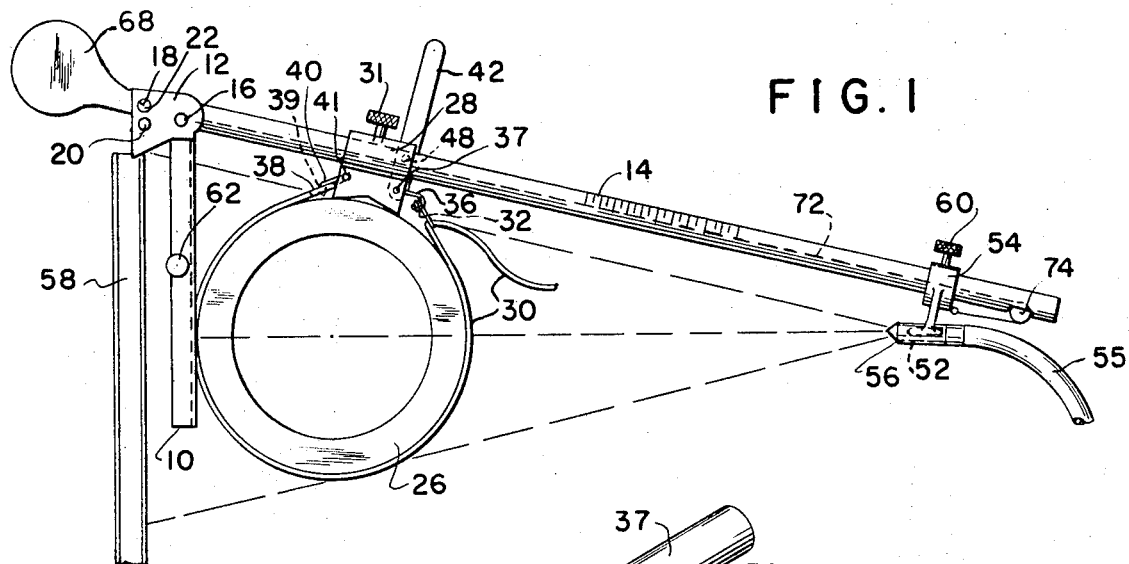
FIG. 1 is a side elevation view of the best mode or preferred embodiment of the radiographic instrument of my invention mounted upon a pipe for a center-line examination of the pipe wall.

Radiation emission source 52 utilized in testing pipe 26 is fixedly secured to radiation source holder 54 which in turn is slidably mounted upon the end portion of extension bar 14 remote from cassette frame 10. Radiation source holder 54 can be constructed so that it contains a portion that can be bent so that the relative position of source 52 can be adjusted. Although source 52 is depicted as being the nozzle of a standard radiographic projector hose 55, other radiation producing devices, e.g., a radium needle, can also be utilized successfully in the pipeline inspection instrument of this invention. In order to reduce the quantity of stray radiation produced by source 52, a lead collimator 56 is fitted over the nozzle of the source to guide the radioactive rays in the direction of pipe 26. Radiation emission source 52 is secured to extension bar 14 in such a manner that emitted radiation can perpendicularly strike the face of radiation-sensitive film 57, shown in FIG. 2, when film 57 is mounted in film holder 58, regardless of where source 52 is positioned along extension bar 14. (Collimator 56 utilizes an aperture opening of such conical angle as to permit radiation to freely intersect the plane of film holder 58, regradless of pipe size or type of shot taken, e.g., center-line or tangential. Consequently, once positioned, no adjustment is required for any angular displacement of source 52 in a tangential shot.) Finger screw 60 threadedly secured within a tapped bore in the upper portion of radiation source holder 54 functions to lock radiation source 52 is fixed position relative to both cassette frame 10 and pipe 26 after source holder 54 has been positioned at the proper calibrated marking along extension bar 14 for a center-line examination of the pipe.

Locking screws 62 positioned approximately midway in the vertical sides of cassette frame 10 function to secure film holder 58, containing radiation-sensitive film 57, in position adjacent pipe 26. Because cassette frame 10 and film 57 are always maintained in tangential relationship with the pipe under examination, only the positioning of source 52 need be varied along calibrated extension bar 14 for diversely diametered pipes to obtain the proper minimum set ratio of Source to film
Pipe center to film necessary for the production of clear precise pipewall images upon the film. This ratio is conveniently termed the source-and-center ratio, and is preferably five-to-one, but ratios such as four-to-one or six-to-one can readily be utilized, although not limited thereto.

Figure 2:
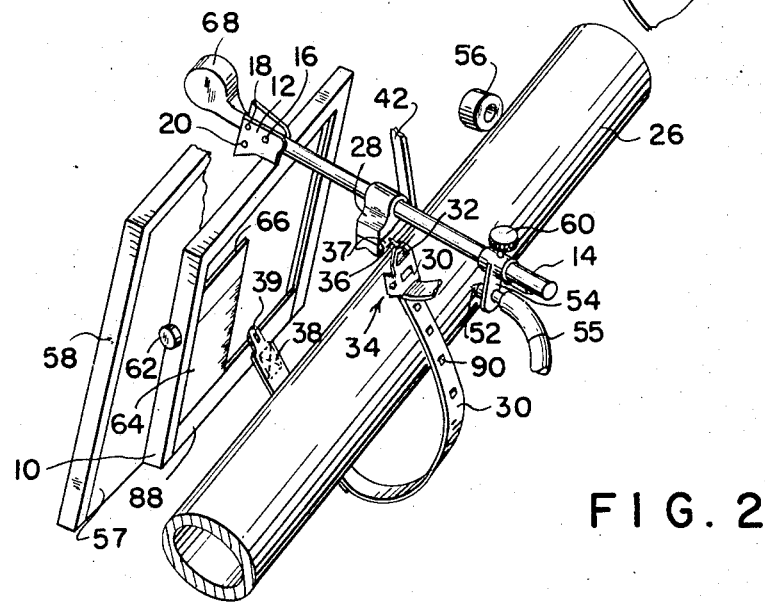
FIG. 2 is a fragmentary exploded isometric view of the radiographic instrument of FIGS. 1 and 4 before mounting upon a pipeline.

Data block panel 64, shown in FIG. 2, secured to the vertical sides of cassette from 10 intermediate radiation source 52 and film 57 functions as a support device for radiation impenetrable devices, e.g., lead numerals, letters or arrows, utilized to identify the exposed film by date, number of orientation of the radiographic test and provide other pertinent record data. Also secured on the cassette frame 10 is conventional step penetrameter 66, shown in FIG. 2, which projects an image on the film to permit a density evaluation of the exposure as opposed to the film condition of pre-exposure or subsequent exposure by stray radiation or by aging.

Pulley housing 68 is mounted on the right-hand extremity of extension bar 14 mechanism and provides part of a means of properly positioning radiation impenetrable marker 70 (shown in FIG. 5) in relation to radiation source 52. Flexible wire 72 is attached to radiation source holder 54, strung around bar 74 which is pivotally mounted at the extremity of extension bar 14 away from pulley housing 68, and strung through passageway 76 (shown in FIG. 5) which traverses extension bar 14 lengthwise. Referring to FIG. 5, wire 72 is wound around and attached to pulley 78 after it is strung through passageway 76. Pulley 78 is pivotally mounted in pulley housing 68 and is coacting in a fixed relationship with pulley 80. Pulley 80 is also pivotally mounted in pulley housing 68. Flexible wire 82 is wound around and attached at one extremity to pulley 80, strung over sleeve 84 which is pivotally mounted around the center segment of pin 16, and attached at the other extremity to radiation impenetrable marker 70. Wire 82 is wound around pulley 80 in a direction reverse of that which wire 72 is wound around pulley 78. Spring 86 is attached to the opposite side of marker 70 and to lower cross bar 88 of cassette frame 10. The tension action of spring 86 holds marker 70 in place once source 52 has been fixedly mounted at a particular point on extension bar 14. Pulleys 78 and 80 are spring loaded by a coil-type spring to maintain a "window blind" action on source holder 54. Pulleys 78 and 80 are designed to provide the same ratio for the movement between wire 72 and wire 82 as the source-and-center ratio utilized in the radiographic instrument. For example, if the source-and-center ratio is five-to-one, the ratio of movement between wire 72 and wire 82 should also be five-to-one. Other suitable means, such as gear reduction means, can be substituted for pulleys 78 and 80.

In operation, in FIG. 1, locking pin 22 is placed through upper aperture 18 in support plate 12 and aperture 24 in extension bar 14 to position extension bar 14 relative to cassette frame 10 for a center-line examination of pipe 26. The instrument is placed upon pipe 26 with ski support fixture 28 resting atop pipe 26, and extension bar 14 is slid within ski support fixture 28 until cassette frame 10 tangentially abuts the outside wall of pipe 26. It is important that pipe 26 fit tangentially against cassette frame 10, so, in variation of my invention, strap 30 could be attached to cassette frame 10 or to some other device as long as pipe 26 is tangential to frame 10.

Figure 3:
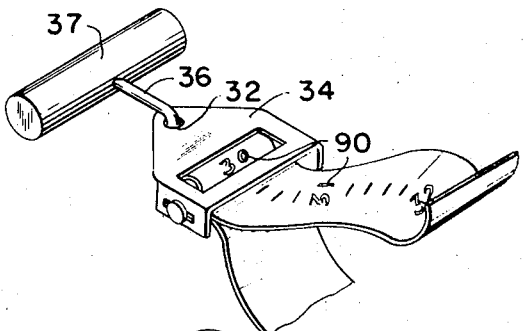
FIG. 3 is a fragmentary isometric view of the belt cinching means for tightly securing the pipe in the proper position.

After strap 30 has been secured about pipe 26 and tightened by hand utilizing adjustable end hook 36, lever 42 is rotated to tighten the belt and a reading of the calibrated markings upon the exterior surface of the belt is obtained utilizing numbers 90 along belt 30 (see FIG. 3). From this reading, representative of the exact circumference of pipe 26, the positioning of radiation source 52, necessary for a proper minimum proportion and a radiation examination of pipe 26 in a perpendicular relationship to film 57 to be inserted subsequently into cassette frame 10, is determined. Extension bar 14 is calibrated in distance to correlate with the calibrations on strap 30. The calibrations on extension bar 14 represent the precalculated position where source 52 should be placed in relation to film frame 58 to obtain the proper radiation emission source to film distance for any pipe to be radiographed. Radiation source holder 54, to which radiation source 52 is secured, is moved along calibrated extension bar 14 until the source is at its optimum position as determined by the reading of the calibrated markings upon strap 30, whereupon source 52 is locked in position by means of finger screw 60.

Lead numerals and letters are placed in data block panel 64 for projection upon the film during examination of the pipe to retain a permanent record of data necessary for proper subsequent interpretation of the film.

Film holder 58, retaining radiation-sensitive film 57 therein, is then inserted into cassette frame 10 and secured therein by rotation of locking screws 62. Marker 70 is automatically moved into the proper position when source 52 is positioned. Film 57 is exposed by the radiation from source source 52, the duration of such exposure being recorded on film 57 by means of step penetrameter 66. Marker 70 is projected as an image on film 70. Data block panel 64 contains calibrated scale 92 (as shown in FIG. 6) which corresponds to calibrated scale 90 on belt 30, and is so located that, when a perfect center-line shot of a pipe is made, the radiation that perpendicularly strikes film 57 passes through the radiation impenetrable calibration mark on scale 92 that corresponds to the same calibration mark on scale 90. The calibration marks 90 on belt 30 are arranged so that the numerals read are the circumference of the pipe. The calibration mark that appears on scale 90 can be placed on data block panel 64 by means of lead impenetrable numerals and recorded as an image on film 57. So, if the image of marker 70 lines up with the proper calibration mark on scale 92, as determined from the recorded mark on scale 90, then a center-line shot was made, and, if not, the shot was not a center-line shot, but the degree of error can be readily calculated for all of the necessary geometric data is known. The same calculation can be obtained by the use of a radiation impenetrable arrow, slidably mounted on scale 92, which is slid to the proper calibration mark on scale 92 as determined from the recorded mark on scale 90. When a source-and-center ratio of five-to-one is used (or, for that matter, any other ratio, such as six-to-one), the angle between support bar 14 and cassete frame 10 is known. By fixing this angle, there is a fixed relationship between source-to-film distance and pipe circumference regardless of the circumference of the pipe used. When the source-and-center ratio is five-to-one, this fixed relationship affords an observed diameter of a pipe on an exposed radiograph (film 57) that is 1.25 times larger than the true pipe diameter. This factor, plus the strap calibration measurement recorded on an exposed radiograph, will allow measurement of pipes that are covered with layers of material, such as, insulation.

FIG. 2 is an exploded isometric view of FIG. 1 which illustrates certain parts of the radiographic instrument that are not shown in FIG. 1. FIG. 3 illustrates how the appropriate calibration marks on calibrated scale 90 on belt 30 are indicated in the preferred embodiment.

Referring to FIG. 4, when a non-center line examination of the pipe wall is desirable in order to reduce the radiographic exposure time required for large diameter pipes, or to avoid adding extensions to bar 14 because of the finite length of extension bar 14, the angular attitude between extension bar 14 and cassette frame 10 can be varied to an obtuse angular relationship by positioning locking pin 22 in lower aperture 20 of support plate 12 and aperture 24 in extension bar 14. An angle of 105 degrees had been found to be satisfactory. Pipe 26 is placed in tangential relationship with cassette frame 10, with ski support fixture 28 resting against pipe 26 to displace extension bar 14 from pipe 26. Calibrated strap 30 is secured around pipe 26. After reading calibrated strap 30, radiation source holder 54 is moved to the corresponding calibrated position on calibrated extension bar 14 to provide the proper attitude of source 52 and film 62 for inspection of the pipeline wall. Since the angle between extension bar 14 and cassette frame 10 is obtuse, marker 70 will not line up with the recorded calibration mark on scale 92; this difference is of little practical value in analyzing a non-center line shot. Film 62 is then inserted into cassette frame 10 to obtain a radiographic image of the sidewall of pipe 26 for subsequent interpretation.

FIG. 5 depicts a partially exploded isometric view similar to FIG. 1 with the pulley and wire system within extension bar 14 exposed to view. Marker 70 and spring 86 are also illustrated. Thus, the interconnection and interplay in the positioning of source 52 and marker 70 can readily be seen.

FIG. 6 exposes the setup within cassette frame 10, particularly illustrating the positions of calibration scale 92 and marker 70.

With slight adjustments and modifications of interpretation, the radiographic instrument can be used for many different pipe configurations, e.g., T's, elbows, etc.

The cinching and attaching means used on belt 30 can be anything that accomplishes the same purposes, for example, a clamping device could be used in place of the illustrated hook arrangement.

I claim:
1. A radiographic instrument for examining a pipe wall comprising:
   (a) means for supporting radiation-sensitive film;
   (b) extension means attached to the film support means and positionable in a pre-determined angular relationship with the film support means;
   (c) penetrating radiation emission source positionably attached to the extension means;
   (d) adjustable, flexible strap means attached to the extension means whereby the pipe is held firmly against the extension means and tangentially against the film support means; and
   (e) means, which are responsive to the outer circumference of the pipe, to indicate the outer circumference of the pipe, to indicate the desired position of the penetrating radiation emission source on the extension means and to indicate the incidental angle by which emitted radiation strikes the radiation-sensitive film.

2. The instrument of claim 1 in which means (e) indicates that incidental point at which emitted radiation strikes the radiation-sensitive film at a right angle.

3. A radiographic instrument for examining a pipe wall comprising:
   (a) means for supporting radiation-sensitive film;
   (b) extension means attached to the film support means and positionable in a pre-determined angular relationship with the film support means;
   (c) penetrating radiation emission source positionably attached to the extension means;
   (d) adjustable, flexible strap means attached to the extension means whereby a pipe is held firmly against the extension means and tangentially against the film support means;
   (e) calibration means on the flexible strap means, responsive to the pipe circumference, to indicate the distance the penetrating radiation emission source should be placed relative to the film according to pipe circumference;
   (f) calibration means on the extension means correlated with the calibration means on the flexible strap to indicate the desired position of the penetrating radiation emission source on the extension means to direct the emitted radiation through the pipe to the radiation-sensitive film;
   (g) radiation impenetrable means responsive to the calibration means on the extension means, positioned between the pipe and the film; and
   (h) radiation impenetrable calibration means, positioned between the pipe and film, correlated with the calibration means on the flexible strap to indicate a variance with the radiation impenetrable means whereby the angle which the emitted radiation passing through the longitudinal axis of the pipe strikes the film is indicated.

4. The instrument of claim 3 in which the extension means is an extension bar, and the film support means is a frame that is attached pivotally to the extension bar.

5. The instrument of claim 4 in which the extension bar is pivotally attached to a support plate fixedly attached to the frame.

6. The instrument of claim 4 in which the frame includes a pivotable lever means to which the flexible strap is attached to apply tension to the strap to secure the instrument to the pipe.

7. The instrument of claim 4 including a positioning bar slidably attached to the extension bar to displace the extension bar relative to the pipe.

8. The instrument of claim 4 including a protective shield for the radiation emission source.

9. The instrument of claim 4 including radiation impenetrable indicia between the radiation emission source and film for imparting record data on the film.

10. The instrument of claim 4 which also includes radiation impenetrable means positioned between the radiation emission source and the film so as to provide on the film an indication of the measured pipe circumference.

11. The instrument of claim 4 in which the radiation source is aligned so that the emitted radiation strikes the radiation-sensitive film at an angle of 90°.

References Cited

UNITED STATES PATENTS 2,957,987  10/1960  Arnesen  250—65

RALPH G. NILSON, Primary Examiner

A. L. BIRCH, Assistant Examiner

U.S. Cl. X.R.

250—67